United States Patent [19]

Sakai

[11] 4,393,681
[45] Jul. 19, 1983

[54] METHOD OF MANUFACTURING HERMETIC SEALING MEMBER

[75] Inventor: Masao Sakai, Mobara, Japan

[73] Assignee: Hitachi, Ltd., Tokyo, Japan

[21] Appl. No.: 171,643

[22] Filed: Jul. 23, 1980

[30] Foreign Application Priority Data

Jul. 23, 1979 [JP] Japan ................................. 54-92674

[51] Int. Cl.³ ............................................. B21D 31/02
[52] U.S. Cl. ..................................... 72/329; 72/334; 72/336; 72/347
[58] Field of Search ................. 72/330, 333, 334, 335, 72/336, 347, 348

[56] References Cited

U.S. PATENT DOCUMENTS

| 1,048,046 | 12/1912 | Currey | 72/334 |
| 1,373,725 | 4/1921 | Heiby | 72/334 |
| 3,057,042 | 10/1962 | Lawson | 72/333 |
| 4,070,895 | 1/1978 | Yamada | 72/334 |

Primary Examiner—Leon Gilden
Attorney, Agent, or Firm—Charles E. Pfund

[57] ABSTRACT

A metal sealing member comprising a metal cylindrical member, one end thereof being adapted to be soldered to another member to form a hermetic sealing structure is manufactured by squeezing a metal plate into a cup-shaped member, forming an annular recess at an opening of the cup-shaped member or forming a circular projection at a bottom thereof, and cutting the annular recess or a portion surrounding the circular projection.

6 Claims, 8 Drawing Figures

FIG.5(a)
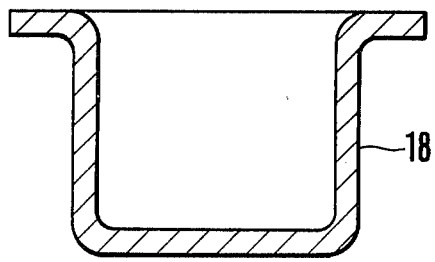
FIG.5(b)
FIG.5(c)
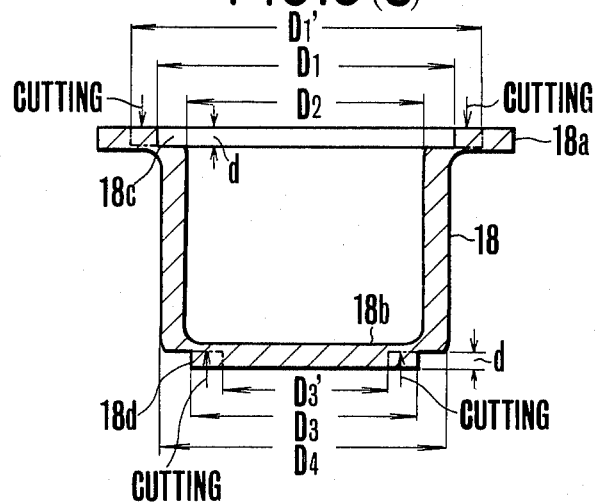
FIG.5(d)
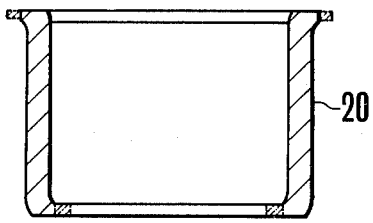

METHOD OF MANUFACTURING HERMETIC SEALING MEMBER

BACKGROUND OF THE INVENTION

This invention relates to a method of manufacturing a hermetic sealing member having improved airtightness and which can be manufactured at a low cost.

Generally, in an electronic tube, for the purpose of improving electrical insulating strength between electrodes and providing, strength and durability, a sealing structure is widely used in which a ceramic member and a metal member are bonded together with solder.

FIG. 1 shows one example of a magnetron tube utilizing a seal member in which a ceramic member and a metal member are soldered together. The magnetron tube comprises an anode cylinder 1 and vanes 2 defining a plurality of resonance cavities divided in radial direction, the vanes 2 and the anode cylinders constituting an anode electrode 3. At the center of the anode electrode 3 is disposed a cathode electrode 4 made of a helically wound electric heating wire 4 with a predetermined spacing between it and the vanes to form an interaction space 5. Circular end plates 6a and 6b are secured to the opposite ends of the anode electrode 1 by soldering or arc welding. Permanent magnets 7a and 7b are secured to the inner surfaces of the end plates by magnet holders 8a and 8b to form a magnetic circuit A and to concentrate magnetic flux in the interaction space 5. A metal cylinder 9 made of Kovar, for example, is soldered to the outer surface of the end plate 6a and a ceramic cylinder 10 of an alumina ceramic is soldered to the other end of the metal cylinder 9 to form a hermetic seal structure. An exhaust pipe 11 formed by chipping off a copper tube is secured to the other end of the ceramic cylinder to form an enclosure. The exhaust pipe 11 is airtightly connected to an antenna lead wire 12 connected to a portion of a vane 2. A metal cover 13 is secured to the outer periphery of the exhaust pipe 11 for protecting the airtight connection and for preventing an electric arc from being caused by excessive concentration of electric field.

The metal cover 13 is also used as a high frequency antenna. A metal cylinder 14 made of Kovar, for example, is soldered to the outer surface of the end plate 6b, and a stem 15 for supporting the cathode electrode 4 is soldered to the opposite end of the metal cylinder 14.

In the magnetron constructed as described above, when a predetermined filament voltage is applied to the outer end of the stem, the cathode electrode 4 will be heated and when a predetermined voltage is applied to the anode electrode 3, the cathode electrode 4 will emit thermoelectrons. When these electrons whirl in the magnetic field in the interaction space 5, high frequency oscillations are produced in the interaction space and the oscillation output is radiated into an oven of a high frequency range, for example, through the antenna conductor 12 and through the metal cover 13 acting as a high frequency antenna to heat or defrost foodstuffs.

FIG. 2 is a longitudinal sectional view showing the details of the soldered sealing structure shown in FIG. 1. The ceramic cylinder 10 consists essentially of alumina with its end surface metallized by sintering a powder of molybdenum and the cylinder 9 is made of Kovar and has a wall thickness of from 0.3 to 1 mm. The ceramic cylinder 10 and the metal cylinder 9 are hermetically bonded together by interposing a solder 16 such as a silver-copper alloy between the ends thereof and then heating the assembly in a reducing or inert atmosphere.

To obtain a high quality hermetic seal structure, it is necessary to carefully select the soldering temperature, the purity of the solder, the pressure applied to the parts at the time of soldering. To satisfactorily solder a metal cylinder and a ceramic cylinder, it is necessary to finish the end surfaces to be soldered with perfect flatness. Usually, the irregularities of these end surfaces should be limited to be less than 0.1 mm. Otherwise small gaps may be formed and thus perfect airtightness could not be assured or the strength of the hermetic bond would be decreased. For this reason, one end of the metal cylinder 9 is cut away along line C—C shown in FIG. 3, which increases the cost of manufacturing.

Although such metal cylinders 9 may be cut out from a length of a metal pipe, the metal pipe is relatively expensive and repeated cutting is not efficient. For this reason, it has been the practice to prepare a metal cylinder 9 by pressing according to the steps a, b and c shown in FIG. 4.

More particularly, a Kovar plate 17 shown in FIG. 4a is deformed into a cup-shaped member 18 as shown in FIG. 4b and then the flange and the bottom of the cup-shaped member 18 are removed to obtain a cylindrical body as shown in FIG. 4c. With this method, however, when removing the flange and the bottom, it is difficult to make uniform the circumferential clearance between the cylindrical body and the metal mold or die, not shown. Moreover, at the time of deforming, the radius of curvature at the inner periphery of the flange is not always uniform so that the flatness of the resulting cylindrical body is impaired.

To obviate these difficulties, the opposite ends of the cylindrical body were sheared perpendicularly to the axis thereof. But, difficulties are encountered in fabricating a metal mold which can serve for the cylinder squeezing and the shearing in combination and such a metal mold becomes very expensive. Separate metal molds for these purposes are also expensive.

SUMMARY OF THE INVENTION

Accordingly, it is an object of this invention to provide an inexpensive method of manufacturing a hermetic seal member comprising a cylinder having sufficiently large end surface flatness.

According to this invention, there is provided a method of manufacturing a hermetic seal member including a metal cylinder, at least one end thereof being adapted to be soldered to another member to form a hermetic sealing structure, comprising the steps of deforming a metal plate into a cup-shaped member, pressing at least one end surface of the cup-shaped member to form an annular recess or a circular projection concentric with an axis of the cup-shaped member, and cutting the annular recess or an annular portion surrounding the circular projection along a circle concentric with the axis.

BRIEF DESCRIPTION OF THE DRAWINGS

In the accompanying drawings:

FIGS. 5a through 5d show successive steps of manufacturing a cylindrical body according to the method of this invention.

DESCRIPTION OF THE PREFERRED EMBODIMENT

Figure 1:
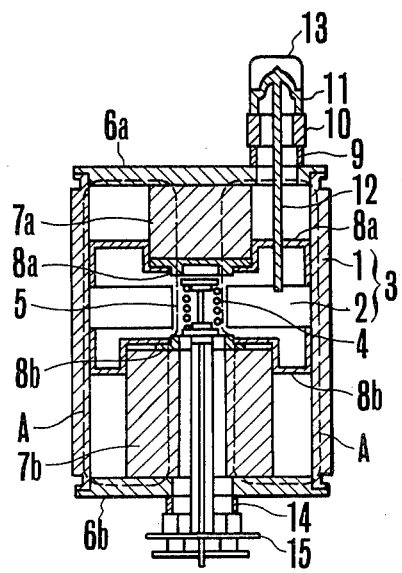
FIG. 1 is a diagrammatic longitudinal sectional view showing a magnetron tube to which the invention is applicable.
Figure 2:
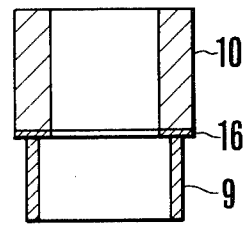
FIG. 2 is a longitudinal sectional view showing the construction of the hermetic sealing structure utilized in the magnetron tube shown in FIG. 1.
Figure 3:
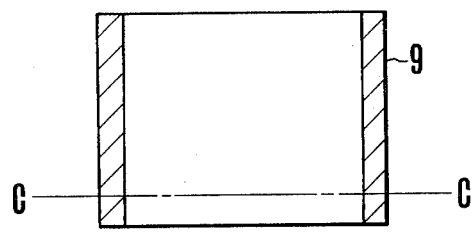
FIG. 3 is an enlarged longitudinal sectional view of the metal cylinder shown in FIG. 2.
Figure 4A:
FIGS. 4a, 4b and 4c show one example of prior art method of manufacturing a cylindrical body utilized to prepare an airtight sealing structure.
Figure 4B:
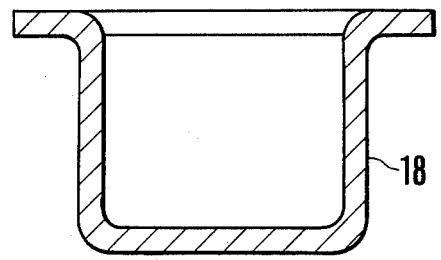
Figure 4C:
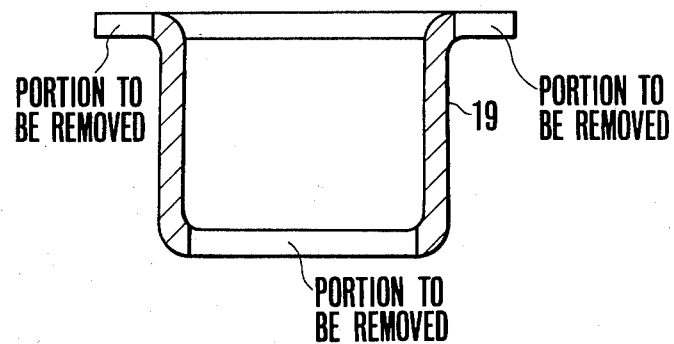

One embodiment of the method of manufacturing a hermetic seal member of this invention will now be described with reference to FIGS.. 5a through 5d. At first a Kovar metal plate 17 shown in FIG. 5a is deformed into a cup-shaped member 18 shown in FIG 5b. Then, as shown in FIG. 5c, the peripheries of the opening and the bottom of the cup-shaped body 18 are pressed to form a recess 18c and a circular projection 18d respectively having depth and height d which is smaller than the thickness of the plate 17. In FIG. 5c, $D_1$ represents the outer diameter of the annular recess 18c, $D_2$ the inner diameter of the cup-shaped body, $D_3$ the diameter of the circular projection and $D_4$ the outer diameter of the cup-shaped body.

The recess and a portion surrounding the projection are cut along a circle concentric with the axis of the cup-shaped body 18 to remove a flange 18a and the bottom 18b of the cup-shaped body to thereby obtain a cylindrical body 20 shown in FIG. 5d. Where a relation $D_1 > D_4 > D_2 > D_3$ is satisfied, a cylindrical body having uniformly flat end surfaces can be obtained when cutting along circles of diameters $D_4$ and $D_2$.

When the recess 18c and the projection 18d are cut away along circles having diameters $D_1$ and $D_3$ respectively, a hermetic seal member can be obtained as shown by solid lines in FIG. 5d. But when the diameter $D_1$ is enlarged to $D'_1$ and diameter $D_3$ is reduced to $D'_3$ shown by dot and dash lines as shown in FIG. 5c and then the cylindrical body is cut at points shown by arrows, portions as shown at chained lines in FIG. 5d can be added to increase the areas of the bonding surfaces.

The hermetic seal member 20 manufactured in this manner has flat bonding surfaces at the opposite ends and its height can be accurately determined. When it is not necessary to form the bonding surfaces on both ends, either one of the annular recess and the circular porjection is formed.

According to the method of this invention described above, sufficient flatness of the bonding surface can be assured by mere press work which can be performed by adding a metal mold for the press work to an ordinary transfer metal molds, thus decreasing the cost of manufacturing and producing reliable and accurate sealing structures at a high yield.

Although in the foregoing embodiment, a Kovar plate was worked for obtaining an airtight sealing structure for use in a magnetron tube, it will be appreciated that a metal plate of steel or copper can be substituted for the Kovar plate.

Further, although in the foregoing embodiment the height d was explained as being smaller than the thickness of the plate 17, it should be understood that the height d may be made larger than the thickness of the plate 17 by pressing the cup-shaped body 18 more greatly than the case shown in FIG. 5C as long as the continuation of the cylindrical wall of the cup-shaped body 18 to the bottom wall thereof is kept undisturbed.

As has been described hereinabove, according to the method of this invention, as it is possible to readily manufacture a metal cylinder with an end surface having a high degree of flatness, it is possible to obtain a airtight sealing structure having a high airtightness, a large bonding strength and reliability that can be soldered to a cooperating member.

What is claimed is:

1. A method of manufacturing a hermetic seal member including a metal cylinder, at least one end thereof being adapted to be soldered to another member to form a hermetic sealing structure, comprising the steps of deforming a metal plate into a cup-shaped member, pressing the periphery only of at least one end surface of said cup-shaped member to compress a portion of said end surface periphery into an annular flat concentric with the longitudinal axis of said cup-shaped member, and making a concentric cut through said end surface at a diameter which leaves a portion of said annular flat as the remainder of said end surface of said cup-shaped member.

2. The method according to claim 1 wherein said annular flat is formed as an annular recess at the periphery of the open end of said cup-shaped member.

3. The method according to claim 1 wherein said annular flat is formed as a circular projection on the outer side of the periphery of the bottom wall of said cup-shaped member.

4. A method according to claim 1 wherein said pressing step compresses the peripheral portion of said end surface less than the thickness of said metal plate.

5. The method according to claim 1 wherein both end surfaces of said cup-shaped member are pressed to form annular flats in the form of an annular recess at the inner periphery of the open end of said member and a circular projection on the outer periphery of the bottom wall of said member.

6. The method according to claim 5 wherein said deforming and pressing steps are adapted to provide an outer diameter $D_1$ of said recess, an inner diameter $D_2$ of said cup-shaped body, a diameter $D_3$ of said circular projection and an outer diameter $D_4$ of said cup-shaped member which satisfy the following relation:

$$D_1 > D_4 > D_2 > D_3.$$

* * * * *